United States Patent [11] 3,539,158

| [72] | Inventor | John Treymann Roos<br>Westwood, Massachusetts |
|---|---|---|
| [21] | Appl. No. | 740,759 |
| [22] | Filed | June 27, 1968 |
| [45] | Patented | Nov. 10, 1970 |
| [73] | Assignee | Bird Machine Company<br>South Walpole, Massachusetts<br>a corporation of Massachusetts |

[54] MECHANICAL SURFACE AERATOR
6 Claims, 5 Drawing Figs.

[52] U.S. Cl. .................................................. 261/36,
261/71, 261/84
[51] Int. Cl. ....................................................... B01f 3/04
[50] Field of Search ............................................. 210/197,
219, 220, 221; 261/36, 66, 71, 83, 84, 87, 93

[56] References Cited
UNITED STATES PATENTS

| 2,063,301 | 12/1936 | Durdin | 210/197X |
| 2,404,701 | 7/1946 | Felsecker | 210/197 |
| 2,802,647 | 8/1957 | Bolton | 210/197X |
| 3,152,071 | 10/1964 | Kraft | 210/197X |

Primary Examiner—Frank W. Lutter
Assistant Examiner—Steven H. Markowitz
Attorney—Edgar H. Kent ABSTRACT: A mechanical surface aerator, in which the impeller is surrounded by a container such as a cone, is provided with a valved submerged inlet by which the rate of flow of liquid into the container can be varied to change the liquid level in the container and thus alter the output and aeration intensity of the aerator without stopping the impeller or changing its speed. Means for controlling vortical flow into the container and for improving the liquid circulation pattern induced by the aerator are also disclosed.

Patented Nov. 10, 1970
3,539,158
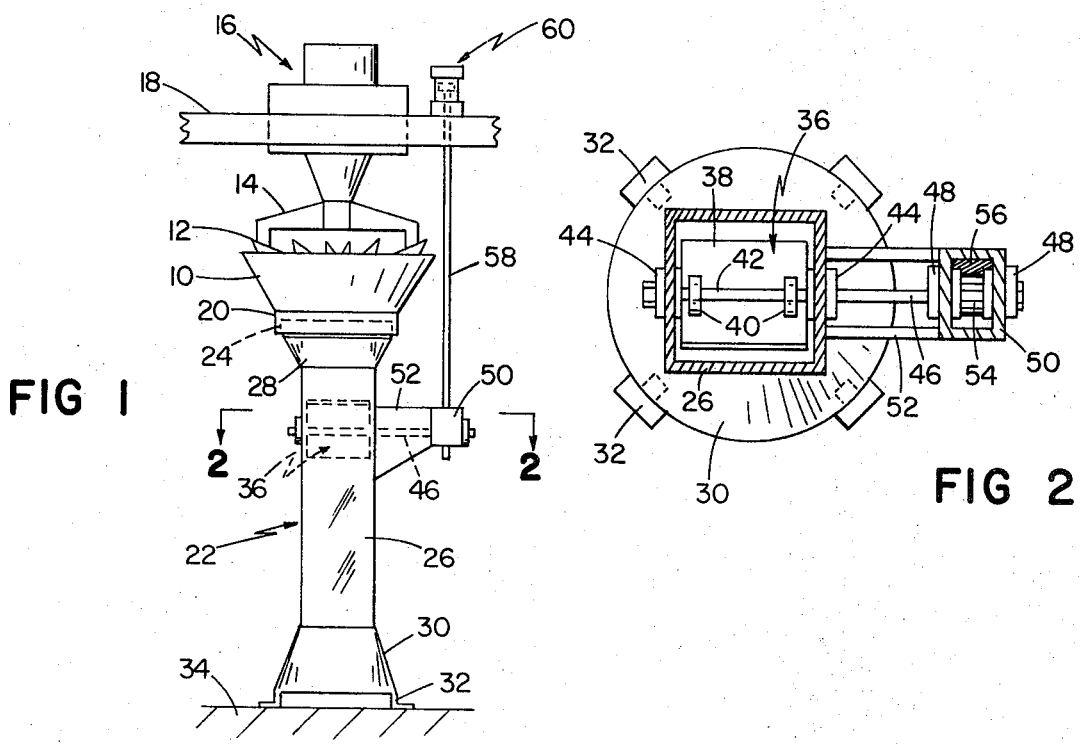
FIG 1
FIG 2
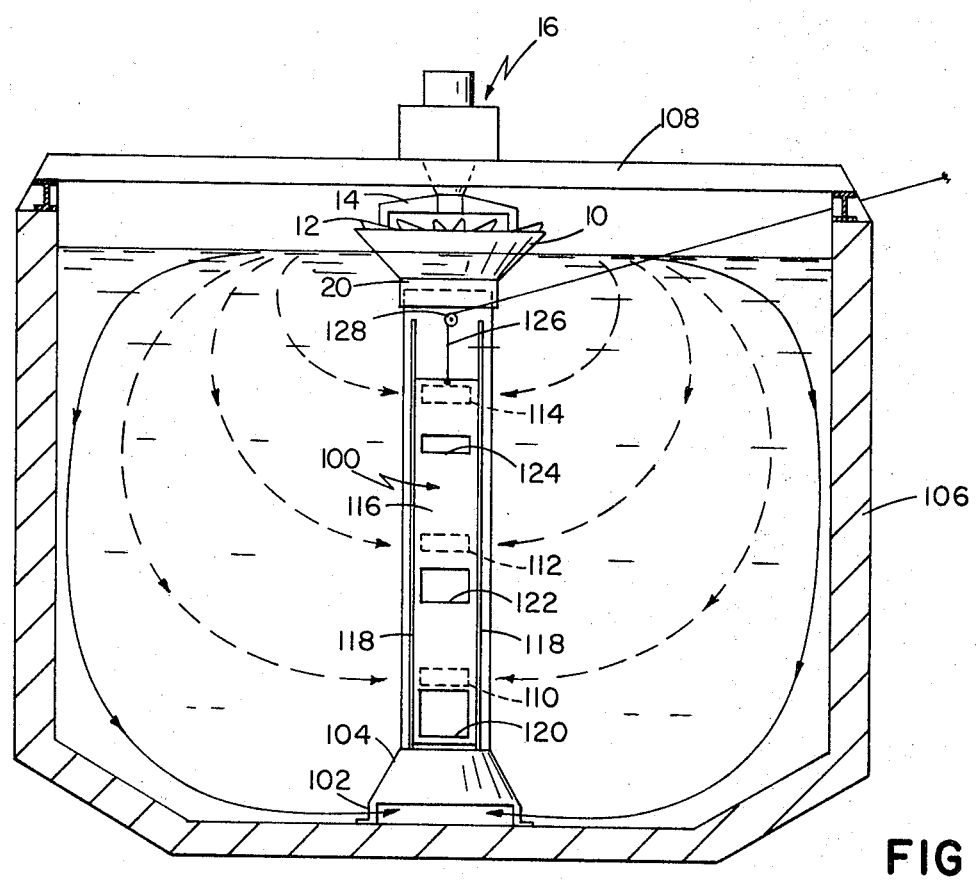
FIG 5

MECHANICAL SURFACE AERATOR

This invention concerns mechanical surface aerators for aerating large bodies of liquid such as sewage aeration tanks and lagoons. More particularly the invention relates to means for adjusting the effective liquid level in which the aerator operates.

Aerators which this invention concerns have an impeller located at the air-liquid interface that violently agitates the liquid and forms it into spray, streams and waves which are thrown or forced outwardly and entrap large quantities of air as bubbles. In general it is important that the intensity of the aeration produced by such aerators be variable within rather wide limits. In sewage treatment, for example, the degree of aeration should be varied according to changing conditions such as variations in sewage strength, rate of flow and oxygen content. Overaeration should be avoided as well as insufficient aeration not only for economical use of power but also because overaeration interferes with proper floc formation in the activated sludge process. Hence regulated aeration between upper and lower limits is desirable.

The intensity of aeration is a function both of speed and degree of immersion of the impeller in the liquid. Controlling intensity by varying speed is not practicable in most cases, at least on an individual aerator basis. To provide the individual aerators with variable speed motors, or variable speed transmissions from a common line shaft would be prohibitively expensive. Usually, therefore, intensity of aeration is controlled by varying the extent of immersion of the impeller. Some aerators are equipped to regulate impeller immersion by adjusting the impeller supporting drive shaft toward and from the liquid surface. However, this is a time consuming operation which requires stopping the aerator and is not adapted to the daily adjustments at short intervals often desirable. In channel aeration, impeller immersion has usually been adjusted by regulating an adjustable outlet weir to raise or lower the level of liquid in the channel. This, of course, affects all aerators in the channel equally which may not be most advantageous and requires discharge of liquid from the channel at times and in volumes that may be undesirable.

A primary object of this invention is to provide mechanical surface aerators with mechanism by which immersion of the impeller and its output at given speed can be adjustably varied on an individual aerator basis, without stopping the aerator and without changing liquid level in the body. Another object is to provide such mechanism which is inexpensive and is quickly and easily operated. A further object is to provide such mechanism which exerts desirable regulating action on the flow induced by the aerator.

In attaining these objects, the aerator is provided with a container for liquid which surrounds the impeller and has an open top portion through which the impeller ejects the liquid from the container onto the surface of the liquid body. The container has a submerged inlet provided with valve means for adjustably varying the amount of the liquid that is drawn into the container by the pumping action of the impeller at a given speed. By suitably regulating the valve means the liquid level in the container and amount of submergence of the impeller can, as desired, be lowered from or raised toward a maximum determined by the fully open condition of the valve means and the level of the liquid outside the container. The intensity of aeration induced by the impeller action is thus varied without stopping the impeller, changing its speed or changing the liquid level of the body of liquid being aerated.

In a preferred embodiment, the aerator is of the cone type in which the container is the rotary cone carrying on its inner surface blades forming the impeller. The inlet comprises a central opening in the cone and a short or long draft tube having therein a valve, such as a butterfly valve, or a multivane valve, which is operated by linkage extending out of the liquid body to a convenient location for manual or power operation to variably throttle flow to the container. The draft tube may be of any suitable cross-sectional shape but may desirably be made of substantially square or other nonround cross section, as this tends to inhibit vortical flow, which the aerator tends to induce in a round cross section draft tube and which may adversely affect uniformity of liquid level and of impeller action.

As a desirable alternative to the valve arrangement just referred to, in order to regulate flow within the liquid body, the container may be provided with a draft tube extending substantially to the bottom of the liquid body. One or more inlets into the draft tube adjacent its base and always open have a restricted cross-sectional area such as to permit liquid to flow into the draft tube with the impeller operating at predetermined speed at a minimum rate corresponding to minimum desired liquid level in the container and to minimum desired impeller output and aeration intensity. Auxiliary inlets spaced longitudinally of the draft tube are provided with valve means in the form of closures by which the inlet can be opened to varying degrees through operating linkage extending out of the liquid body. The combined cross-sectional area of these auxiliary inlets fully opened, plus that of the always open bottom inlet or inlets, permits liquid flow into the draft tube at such predetermined impeller speed at a maximum rate corresponding to maximum desired liquid level in the container and to maximum desired impeller output and aeration intensity.

When the auxiliary inlets are closed, the circulation pattern induced in the liquid body by the impeller is generally across the top to the sidewalls containing the liquid, down along these walls and inward along the bottom to the bottom inlet or inlets to the draft tube. Such a circulating pattern is important in preventing settled solids accumulations on the walls and bottom and minimum inlet into the draft tube is sized to produce an adequate flow in this pattern. However this peripheral pattern of flow leaves relatively immobile or "dead" areas of liquid between the circulating flow and the draft tube. When low intensity of aeration is desired this is not of great consequence but when high intensity is needed a circulation pattern leaving these dead areas results in overaeration in the circulated part and underaeration in the relatively noncirculated areas, with adverse consequences. The auxiliary inlets arranged along the draft tube, which are open when high intensity aeration is needed, divert part of the flow through the liquid zone inside peripheral flow to the auxiliary inlets, thus producing a much superior uniformity of circulation and of aeration. Since at high intensity operation the impeller is circulating a much larger volume of liquid than at low intensity operation, peripheral flow to the bottom inlet of the draft tube continues at the predetermined rate adequate for wall and bottom scouring, the diverted flow being excess not needed for this purpose.

The cone type aerator is preferred because it is designed with a cone surrounding and supporting the impeller blades and provides the container which this invention requires. However, other types of aerators having impellers designed for operation in the liquid without a surrounding cone may, to advantage, be equipped with a cone or other surrounding container, which may be stationary or may be secured to and rotate with the impeller. In this way impeller immersion and aeration intensity may be regulated by adjusting the flow into the container in accordance with this invention.

In the accompanying drawings, which illustrate preferred embodiments:

FIG. 1 is an elevation view of a cone type aerator and draft tube in accordance with the invention with supporting structure broken away;

FIG. 2 is a transverse section on line 2-2 of FIG. 1, looking in the direction of the arrows;

FIG. 5 is an elevation view of still another embodiment mounted in a tank shown in vertical cross section.

Figure 3:
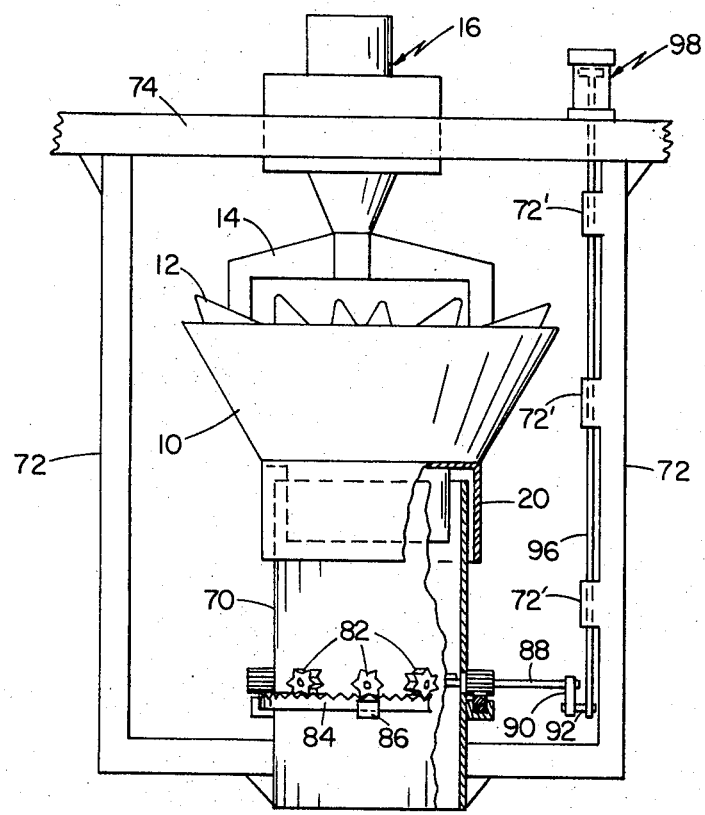
FIG. 3 is an elevation view, partly broken away, of another embodiment.

Referring first to FIG. 1, the aerator there shown and in FIGS. 3 and 5 is of the well-known and commercially available cone type, and may be constructed as disclosed in more detail in Bolton U.S. Pat. No. 2,802,647, dated Aug. 13, 1957. It has a cone 10 provided on its inner surface with blades 12. The cone is supported and rotated by a spider 14 connected to the drive shaft of a gear motor 16 mounted on frame work partially shown at 18 extending over a liquid body. The cone has an outer bottom skirt 20 of circular cross section and an inner skirt of like shape (not shown) forming between them a slot within which is received the circular cross section upper end 24 of a draft tube 22, this arrangement forming the usual air-liquid seal between the cone and the upper end of the draft tube. In accordance with a preference expressed earlier herein the draft tube has mainly a portion 26 of substantially square cross section, portion 26 being joined to circular cross section top 24 by a suitably flared portion 28. The bottom of portion 26 is provided with flared skirt 30 which is supported by legs 32 from the bottom wall confining the liquid body, said wall being partially shown at 34, the clearance between skirt 30 and wall 34 providing the access opening for the liquid into the draft tube.

In the embodiment of FIG. 1 flow restriction through the draft tube is varied to vary the liquid level in the cone by means of a valve of the single vane butterfly type designated generally 36. Referring particularly to FIG. 2, the vane 38 is fastened by lugs 40 to a shaft 42 which is rotatable in bearings 44 in opposite walls of portion 26 of the draft tube. An extended end 46 of shaft 42 projects laterally beyond the maximum radius of cone 10 and is rotatably received in bearings 48 in the side walls of a slide box 50 supported from the adjacent wall of draft tube portion 26 by plates 52. Shaft 42 is rotated between maximum and minimum flow restriction positions by a toothed pinion 54 fastened to shaft end 46 in box 50 and rack 56 slidable in box 50 between an end wall thereof and pinion 54. The rack has teeth meshing with those of the pinion and is fastened to a rod 58 which extends up and out of the liquid body to suitable operating means such as fluid pressure motor 60 on frame 18 which reciprocates rod 58 vertically to the desired extent.

In the embodiment just described vortical flow in the draft tube is inhibited not only by the noncircular shape of portion 26 thereof but also by the interference thereto provided by vane 38.

Figure 4:
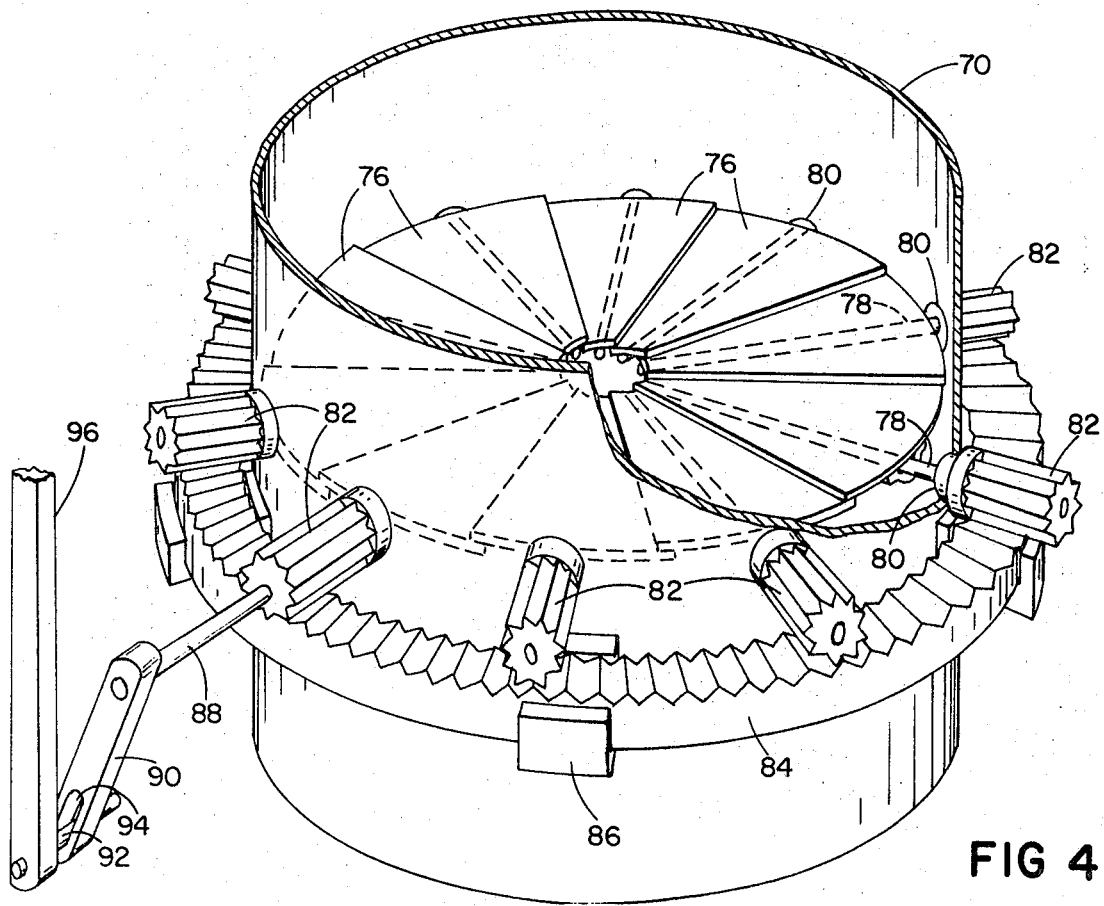
FIG. 4 is an enlarged view, partially in elevation, partially in transverse section, of the valve mechanism of FIG. 3.

In the modification shown in FIGS. 3 and 4 the aerator is provided with a short draft tube 70 which is supported by struts 72 from a frame partially shown at 74 to which the aerator motor 16 is also secured. Frame 74 may be secured to fixed or floating supports (not shown). The valve for variably obstructing the flow from the open bottom of the draft tube into the cone is in this instance of the multivane type, having, as particularly shown in FIG. 4, a plurality of generally pie-shaped vanes 76 which overlap at their edges in the fully closed position in which they are shown in FIG. 4. Each vane is secured to an individual pivot shaft 78 which is cantilever mounted at one end in a bearing 80 in draft tube 70. In large diameter draft tubes the inner ends of shafts 78 may be rotatably mounted in a ring.

The ends of shafts 78 project beyond the draft tube and have fastened thereto pinions 82 having teeth meshing with those on an underlying circular rack 84 which is rotatably slidable in supporting lugs 86 on the draft tube. One shaft 78 is provided with an extension 88 beyond its pinion 82 the outer end of which is fixed to one end of a crank arm 90. The other end of arm 90 is connected by pin 92 pivotally received in slot 94 to operating arm 96 which extends vertically out of the liquid through tubular guides 72' on a strut 72 to an operating motor 98 on frame 74. Rotation of extension 88 by actuation of the operating crank arm linkage rotates its pinion to rotate the rack and all shafts 78 by their pinions 82 to turn vanes 76 equally to desired position.

In fully open, substantially vertical position, vanes 76 offer high resistance to vortical flow of liquid in the draft tube which would tend to reduce the liquid level in the cone below the maximum desired at this position of the valve. When the vanes are partly closed, their action changes from inhibiting vortical flow to inducing it. Such regulated vortical flow is desirable at restricted flow positions of the valve as it adds to the level reducing action of the frictional resistance to flow of the vanes.

In the embodiment shown in FIG. 5 the draft tube 100, which may be of any desired cross-sectional shape but is shown as round, is supported on legs 102 depending from skirt 104 and secured to the bottom of a tank 106. The aerator is supported from a frame 108 mounted on the side walls of the tank. The clearance between the bottom of skirt 104 and the tank bottom provides an inlet which is proportioned to permit a minimum flow of liquid into the draft tube, the flow pattern to the bottom inlet being as generally indicated by the full line arrows from the aerator across the top of the liquid body, down the tank walls and across its bottom. This minimum flow is adequate for scouring the tank walls but is sufficiently restricted so that a desired low level of liquid in cone 10 is maintained at the normal operating speed of the aerator. This bottom inlet therefore corresponds to a maximum throttled position of the valves in the other embodiments.

Auxiliary inlets into the draft tube are provided spaced along its length, three of the same length and width being shown at 110, 112 and 114 in dotted lines because they are closed by a cover plate 116, which is vertically slideable in guides 118 secured to the outer surface of the draft tube. Three openings are provided through the plate 120, 122 and 124, these being all located below inlets 110, 112 and 114 in the fully closed position of the plate shown. Plate openings 120, 122 and 124 are of the same width as draft tube inlets 110, 112 and 114 but vary in lengths, bottom opening 120 being three times, middle opening 122 being twice, and top opening 124 being equal to the length of the draft tube inlets. In closed position of plate 116, opening 120 is located immediately below inlet 110, opening 122 is spaced below inlet 112 by the length of an inlet, and opening 124 is spaced below opening 114 by twice the length of an inlet.

With this closure arrangement it is possible, as is desirable, to open auxiliary inlets 110, 112, and 114 in succession in that order by raising plate 116 and to close in reverse order by lowering the plate. Thus, inlet 110 only is opened by raising plate 116 only the length of the inlet, inlets 110 and 112 only are opened by raising the plate twice the inlet length and all three inlets are fully opened when the plate is raised three times the inlet length. Closing in reverse order takes place when plate 116 is lowered. As each inlet is opened, liquid flow through the draft tube into cone 10 is proportionally increased with resultant increased output and intensity of aeration by the aerator. This increases the volume of circulating flow in the tank, part of which is diverted to each open auxiliary inlet, as indicated by the dotted line arrows. Such diverted flow increases aeration intensity by eliminating dead areas in the liquid which is desirable when aeration intensity above minimum is needed. Since the diverted flow corresponds to the increased circulating flow induced by the aerator it represents excess not needed for the peripheral scouring flow indicated by the full line arrows.

Plate 116 may be simply raised and lowered by means of a cable 126 attached to its upper end and passing over a pulley 128 mounted on the draft tube to a reel or winch (not shown) at the side of the tank. A similar arrangement of auxiliary inlets, closure plate and operating connections may be provided at the opposite side of the draft tube. The number of auxiliary inlets and their size is of course variable depending on such factors as draft tube length, tank size, aerator size and capacity. While the particular arrangement shown is desirable for its simplicity, instead of cover plate 116 the auxiliary inlets may be provided with individual closure plates or covers, which may be hinged, pivoted or slid and operated individually or collectively by suitable cable or other connections. Also, instead of one or more plates 116, a single tubular closure member may be provided which surrounds the draft tube length provided with auxiliary inlets and which is mounted for rotation by suitable mechanism to move openings therein into and out of registry with the auxiliary inlets.

While single aerators are shown in the drawings it will be understood that it is contemplated that aerators according to the invention will frequently be used in multiple for aerating a single body of liquid. Indeed, one of the most useful applications of the invention is to aid in so-called "tapered aeration" where aerators are mounted in one or more rows in a long tank which receives liquid to be aerated at one end and discharges aerated liquid from the other end. In such an arrangement it is usually desirable that the aeration intensity diminish as the liquid proceeds toward the outlet end. However, because of the expense of providing individual drives or differential gearing it has not been usual to taper or reduce the aeration intensity of each successive aerator but rather to arrange the aerators in successive gangs each uniformly operated, the first gang being operated for maximum aeration intensity. By utilizing my invention, it becomes readily feasible to taper aeration intensity of each aerator of a gang uniformly operated and thus attain much better control of the ultimate aeration produced.

The invention also facilitates automatic control of aeration oxygenation between desired limits such as 1 to 2 p.p.m. as indicated by suitable oxygen analyzing equipment such as electric probes immersed in the liquid of the body. Such equipment may be connected to actuate automatically the valve operating mechanism of one or more aerators of the invention as desired to increase or decrease the liquid level in the container according to the indications of the analyzing equipment that more or less oxygenation is needed.

When aerators according to the FIG. 5 embodiment are employed in rows in a single liquid body without walls between aerators, the flow pattern induced by collision of flows from successive aerators is generally similar to that indicated by the solid line arrows in FIG. 5. It should be appreciated that the embodiment of FIG. 5 is not limited in utility to in-tank installations since the formation of dead areas of inadequately circulated liquid is a problem in most cases of aeration installations in liquid bodies of any substantial depth.

I claim:

1. In combination with a mechanical surface aerator suitable for aerating a large body of liquid and having a revolving, bladed impeller operative in liquid adjacent the air-liquid interface of a said body to produce violent agitation of the liquid and to eject it outwardly, mechanism for adjustably regulating the extent of immersion of the impeller in liquid while the impeller is operating, to vary the intensity of aeration produced thereby without changing impeller speed, which comprises:

a container adapted to surround the impeller in the liquid of a said body and having an open top portion through which the impeller ejects the liquid from within said container outwardly to the large body of liquid beyond said container;

inlet means for said container through which liquid of said body flows into said container from below the surface of said liquid body;

valve means connected to said inlet means for adjustably varying the rate of flow of liquid from said body through said inlet means to said container to vary the liquid level in said container; and means connected to said valve means for operating the same, whereby the intensity of aeration can be varied without varying the relative height between the impeller and the large body of liquid beyond the container.

2. The combination of claim 1 wherein said inlet means includes a draft tube having said valve means connected thereto.

3. The combination of claim 2 wherein said valve means is a movable vane type valve mounted in said draft tube.

4. The combination of claim 2 wherein said valve means comprises a plurality of openings into said draft tube spaced longitudinally thereof and means for variably exposing said openings to the liquid of said body.

5. The combination of claim 2 wherein said draft tube is in major part of substantially square cross section.

6. The combination of claim 1 wherein said impeller is of the rotary cone type and said container is the cone of said impeller.